United States Patent
Eddaoudi et al.

(10) Patent No.: US 12,528,044 B2
(45) Date of Patent: Jan. 20, 2026

(54) METHODS FOR CAPTURING $CO_2$ FROM DILUTE CO2 STREAMS OF VARYING HUMIDITY, INCLUDING NATURAL GAS COMBINE CYCLE EXHAUST STREAMS AND AMBIENT AIR STREAMS USING KAUST-7 BASED PHYSISORBENTS

(71) Applicants: Saudi Arabian Oil Company, Dhahran (SA); King Abdullah University of Science and Technology, Thuwal (SA)

(72) Inventors: Mohamed Eddaoudi, Thuwal (SA); Prashant Bhatt, Thuwal (SA); Aqil Jamal, Dhahran (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 653 days.

(21) Appl. No.: 18/060,092

(22) Filed: Nov. 30, 2022

(65) Prior Publication Data
US 2024/0173665 A1    May 30, 2024

(51) Int. Cl.
*B01D 53/14* (2006.01)
*B01D 53/02* (2006.01)
(Continued)

(52) U.S. Cl.
CPC ........ *B01D 53/1418* (2013.01); *B01J 20/226* (2013.01); *B01D 2253/204* (2013.01); *B01D 2256/10* (2013.01); *B01D 2256/12* (2013.01)

(58) Field of Classification Search
None
See application file for complete search history.

(56) References Cited

U.S. PATENT DOCUMENTS

| | | | |
|---|---|---|---|
| 5,376,614 | A | 12/1994 | Birbara et al. |
| 5,876,488 | A | 3/1999 | Birbara et al. |
| | | (Continued) | |

FOREIGN PATENT DOCUMENTS

| | | |
|---|---|---|
| WO | 2014074679 A1 | 5/2014 |
| WO | 2019239324 A2 | 12/2019 |
| WO | 2020113281 A1 | 6/2020 |

OTHER PUBLICATIONS

Siegelman et al., "Challenges and opportunities for adsorption-based CO2 capture from natural gas combined cycle emissions." Energy Environ. Sci., 2019, 12, 2161-2173.*

(Continued)

*Primary Examiner* — Daniel Berns
(74) *Attorney, Agent, or Firm* — Leason Ellis LLP

(57) ABSTRACT

A method for capturing carbon dioxide ($CO_2$) from a humid gas stream is provided. In certain embodiments, the gas stream is a humid natural gas combine cycle (NGCC) exhaust stream. In certain embodiments, the gas stream is a humid air stream. The humid gas stream comprises $CO_2$ and oxygen ($O_2$). In the method, the humid gas stream is contacted with a metal organic framework (MOF) material KAUST-7. The $CO_2$ from the humid gas stream is captured with the KAUST-7 MOF material to generate a $CO_2$-concentrated gas stream comprising approximately 1-30% of $CO_2$.

8 Claims, 7 Drawing Sheets

(51) Int. Cl.
  *B01D 53/04* (2006.01)
  *B01J 20/22* (2006.01)

(56) References Cited

U.S. PATENT DOCUMENTS

| | | |
|---|---|---|
| 7,799,120 B2 | 9/2010 | Yaghi et al. |
| 8,926,736 B2 | 1/2015 | Serre et al. |
| 9,138,719 B1 | 9/2015 | Eddaoudi et al. |
| 9,308,486 B2 | 4/2016 | Chen et al. |
| 10,328,414 B2 | 6/2019 | Eddaoudi et al. |
| 10,335,779 B2 | 7/2019 | Eddaoudi et al. |
| 10,744,482 B2 | 8/2020 | Eddaoudi et al. |
| 10,765,989 B2 | 9/2020 | Eddaoudi et al. |
| 10,781,387 B2 | 9/2020 | Eddaoudi et al. |
| 10,850,268 B2 | 12/2020 | Eddaoudi et al. |
| 10,875,769 B2 | 12/2020 | Ingram et al. |
| 11,077,423 B2 | 8/2021 | Eddaoudi et al. |
| 11,285,426 B2 | 3/2022 | Cadiau et al. |
| 2015/0291870 A1 | 10/2015 | Van Horn et al. |
| 2017/0137450 A1 | 5/2017 | Eddaoudi et al. |
| 2017/0247622 A1 | 8/2017 | Eddaoudi et al. |
| 2020/0384439 A1 | 12/2020 | Belmabkhout et al. |
| 2021/0039078 A1 | 2/2021 | Eddaoudi et al. |
| 2022/0040668 A1 | 2/2022 | Weston |
| 2022/0056064 A1 | 2/2022 | Qazvini et al. |
| 2022/0134307 A1 | 5/2022 | Sadiq et al. |

OTHER PUBLICATIONS

International Search Report and Written Opinion in a corresponding PCT Application No. PCT/US2023/081518 mailed Jun. 20, 2024; 16 pages.
Alcaraz-Calderon et al. "Natural gas combined cycle with exhaust gas recirculation and CO2 capture at part-load operation", Journal of the Energy Institute, vol. 92 (Apr. 2019), pp. 370-381 (Year: 2019). [12 pages].
Babarao et al. "Molecular screening of metal-organic frameworks for CO2 storage." Langmuir, 24, 2008, 6270-6278.
Bae et al. "Carborane-based metal-organic frameworks as highly selective sorbents for CO2 over methane." Chem. Commun., 2008, 4135-4137.
Banerjee et al. "Control of Pore Size and Functionality in Isoreticular Zeolitic Imidazolate Frameworks and their Carbon Dioxide Selective Capture Properties." JACS Communications, 2009, 3875-3877.
Banerjee et al. "High-Throughput Synthesis of Zeolitic Imidazolate Frameworks and Application to CO2 Capture." Science, Feb. 15, 2008, 939-943.
Barcia et al. "Single and multicomponent sorption of CO2, CH4 and N2 in a microporous metal-organic framework." Sep. Sci. Technol. 43, 2008, 3494-3521.
Bastin et al. "A Microporous Metal-Organic Framework for Separation of CO2/N2 and CO21CH4 by Fixed-Bed Adsorption." J. Phys. Chem., 2008, 1575-1581.
Belmabkhout et al. "Amine-Bearing Mesoporous Silica for CO2 and H2S Removal from Natural Gas and Biagas." Langmuir Letter, 2009, 13275-13278.
Belmabkhout et al. "Isothermal versus Non-isothermal Adsorption-Desorption Cycling of Triamine-Grafted Pore-Expanded MCM-41 Mesoporous Silica for CO2 Capture from Flue Gas." Energy & Fuels Article, American Chemical Society, 2010, 5273-5280.
Belmabkhout et al. "Simultaneous Adsorption of H2S and CO2 on Triamine-Grafted Pore-Expanded Mesoporous MCM-41 Silica." Energy & Fuels, ACS Publications, 2011, 1310-1315.
Ben-Mansour et al. "Carbon capture by physical adsorption: materials, experimental investigations and numerical modeling and simulations-a review." Applied Energy 161 (2016): 225-255.
Britt et al. "Highly efficient separation of carbon dioxide by a metal-organic framework replete with open metal sites." Dec. 8, 2009, 20637-20640.
Burd et al. "Highly Selective Carbon Dioxide Uptake by [Cu(bpy-n)2(SiF6)](bpy-1=4,4'-Bipyridine; bpy-2=1,2-Bis(4-pyridyl)ethene)." Journal Of The American Chemical Society, Feb. 8, 2012, 3663-3666.
Cadiau et al. "Hydrothermal synthesis, ab-initio structure determination and NMR study of the first mixed Cu—Al nuorinated MOF." CrystEngComm, The Royal Society of Chemistry, 2013, 3430-3435.
Cadiau et al. "ZnAlF5'[TAZ]: An Al fluorinated MOF of MIL-53{Al} topology with cationic {Zn{1,2,4 triazole)}2 + linkers." Journals of Materials Chemistry, vol. 21, 2011, 3949-3951.
Caskey et al. "Dramatic Tuning of Carbon Dioxide Uptake via Metal Substitution in a Coordination Polymer with Cylindrical Pores." JAGS Communications, 2008, 10870-10871.
Chue et al. "Comparison of Activated Carbon and Zeolite 13X for COa Recovery from Flue Gas by Pressure Swing Adsorption." Ind. Eng. Chem. Res., 1995, 591-598.
Couck et al. "An Amine-Functionalized MIL-53 Metal-Organic Framework with Large Separation Power for CO2 and CH4." JACS, 2009.
Dietzel et al. "Adsorption properties and structure of CO2 adsorbed on open coordination sites of metal-organic framework Ni2 (dhtp) from gas adsorption, IR spectroscopy and X-ray diffraction." ChemComm, 2008, 5125-5127.
Dietzel et al. "Hydrogen adsorption in a nickel based coordination polymer with open metal sites in the cylindrical cavities of the desolvated framework." 2006, 959-961.
Ding et al. "Hydrothermal syntheses and characterization of a series of luminescent Cd(ii) frameworks with pyridine-based and benzene-based bis-triazole ligands." Crystengcomm, vol. 15, No. 13, Jan. 1, 2013, 2490-2503.
Fan et al. "Isoreticular chemistry within metal-organic frameworks for gas storage and separation." Coordination Chemistry Reviews 443 (2021): 213968.
Finsy et al. "Separation of CO2/CH4 mixtures with the MIL-53(Al) metal-organic." Microporous and Mesoporous Materials, 2009, 221-227.
Furkawa et al. "Storage of Hydrogen, Methane, and Carbon Dioxide in Highly Porous Covalent Organic Frameworks for Clean Energy Applications." JAGS Article, American Chemical Society, 2009, 8875-8883.
Gautier et al. "On the Origin of the Differences in Structure Directing Properties of Polar Metal Oxyfluoride [MOxF6-x]2-(x= 1,2) Building Units." Inorganic Chemistry, Jan. 22, 2015, 1712-1719.
Gautier et al. "Orientatinal order of [VOF5]2- and [NbOF5)2-polar units in chains." Journal of Solid State Chemistry, vol. 195, Jan. 24, 12, 132-139.
Guillory et al. "Evidence for Nonpolar Alignment of (NbOF 5] 2-Anions in Cd(pyridine) 4 NbOF 5 Chains." Crystal Growth & Design, Feb. 1, 2006, 382-389.
Haisheng et al. "Microporosity, Optical Bandgap Sizes, and Photocatalytic Activity of M(I)-Nb(V) (M = Cu, Ag) Pxyfluoride Hybrids." Crystal Growth & Design Article, vol. 10, 2010, 1323-1331.
Halasyamani et al. "Syntheses and Structures of Two New Cu/Nb/ pyrazine Complexes: Three Dimensional CuNb(pyz)20F5-(pyz)(H20) and Two Dimensional [Cu(pyz)2.5J+[NbF6-(Pyz)]." Zeitschrift fur anorganische und allgemeine Chemie, 1996, 479-485.
Hamon et al. "Comparative Study of Hydrogen Sulfide Adsorption in the MIL-53(AI, Cr, Fe), MIL-47(V), MIL-100(Cr), and MIL-101(Cr) Metal-Organic Frameworks at Room Temperature." JAGS Communications, Mar. 2, 2009, 8775-6777.
Hao et al. "Upgrading low-quality natural gas with H2S- and CO2-selective polymer membranes Part I. Process design and economics of membrane stages without recycle streams." Journal of Membrane Science, 2002, 177-206.
Heier et al. "The Polar [W02F4]2-Anion in the Solid State." Inorg. Chem., 1999, 762-767.
Hook et al. "An Investigation of Some Sterically Hindered Amines as Potential Carbon Dioxide Scrubbing Compounds." Ind. Eng. Chem. Res., 1997, 1779-1790.

(56) References Cited

OTHER PUBLICATIONS

Izumi et al. "Examining the Out-of-Center Distortion in the (NbOF 5] 2-Anion." Inorganic Chemistry, Feb. 1, 2005, 884-895.
Li et al. "Gas Adsorption and Storage in Metal-Organic Framework MOF-177." Langmuir, 2007, 12937-12944.
Lin et al. "Microporosity, Optical Bandgap Sizes, and Photocatalytic Activity of M(I)-Nb(V) (M =Cu, Ag) Oxyfluoride Hybrids." Crystal Growth & Design, vol. 10, No. 3, 2010, 1323-1331.
Llewellyn et al. "High Uptakes ofCO2 and CH4 in Mesoporous Metal-Organic Frameworks MIL-100 and MIL-101." Langmuir, American Chemical Society, 2008, 7245-7250.
Maggard et al. "Understanding the Role of Helical Chains in the Formation of Noncentrosymmetric Solids." American Chemical Society, 2001, 7742-7743.
Mahenthirarajah et al. "Organic-inorganic hybrid chains and layers constructed from copper-amine cations and early transition metal (Nb, Mo) oxyfluoride anions." Dalton Transaction, Jan. 1, 2009, p. 3280.
Majchrzak-Kuceba et al. "Shaping metal-organic framework (MOF) powder materials for CO2 capture applications—a thermogravimetric study." Journal of Thermal Analysis and Calorimetry 138.6 (2019): 4139-4144.
Mandal et al. "Simultaneous absorption of CO2 and H2S into aqueous blends of N-methyldiethanolamine and diethanolamine." Environ. Sci. Technol. 2006, 40, 6076-6084.
Marvel et al. "Chemical Hardness and the Adaptive Coordination Behavior of the d 0 Transition Metal Oxide Fluoride Anions." Zeitschrift Fur Anorganische und Allgemeine Chemie., vol. 635, No. 6-7, May 31, 2009, 869-877.
Noro et al. "Framework Engineering by Anions and Porous Functionalities of Cu(II)/4,4'-bpy Coordination Polymers." JAGS Articles, vol. 124, 2002, 2568-2583.
Noro et al. "A New, Methane Adsorbent, Porous Coordination Polymer [{CuSiF6(4,4'-bipyridine)2}n]." Angew. Chem. Int. Ed., 2000, 2081-2084.
Nugent et al. "Enhancement of CO2 selectivity in a pillared pcu MOM platform through pillar substitution." ChemComm, The Royal Society of Chemistry, 2013, 1606-1608.
Nugent et al. "Porous materials with optimal adsorption thermodynamics and kinetics for CO2 separation." Nature, Mar. 7, 2013, 80-84.
Park et al. "Exceptional chemical and thermal stability of zeolitic imidazolate frameworks." PNAS, Jul. 5, 2006, 10186-10191.
Phan et al. "Synthesis, Structure, and Carbon Dioxide Capture Properties of Zeolitic Imidazolate Framerworks." Accounts of Chemical Research, vol. 43, No. 1, Oct. 30, 2009, 58-67.
Qasem et al. "Enhancing CO2 Adsorption Capacity and Cycling Stability of Mg-MOF-74." Arabian Journal for Science and Engineering 46.7 (2021): 6219-6228.
Shekhah et al. "Made-to-order metal-organic frameworks for trace carbon dioxide removal and air capture." Nature Communications, Jun. 25, 2014, 1-7.
Shi et al. "Sorbents for the direct capture of CO2 from ambient air." Angewandte Chemie International Edition 59.18 (2020): 6984-7006.
Prashant M. Bhatt et al., "A Fine-Tuned Fluorinated MOF Addresses the Needs for Trace CO2 Removal and Air Capture Using Physisorption", JACS, Jul. 2016, pp. 9301-9307.
Written Opinion of the International Preliminary Examining Authority for PCT Application No. PCT/US2023/081518 dated Nov. 5, 2024 (11 pages).
Tchalala et al.; Fluorinated MOF platform for selective removal and sensing of SO2 from flue gas and air; Nature Communications; 2019; 10 pages.
Siegelman et al. "Water enables efficient CO2 capture from natural gas flue emissions in an oxidation-resistant diamine-appended metal-organic framework." Journal of the American Chemical Society 141.33 (2019): 13171-13186.
Siriwardane et al. "Adsorption of CO2 on Molecular Sieves and Activated Carbon." Energy & Fuels, American Chemical Society, 2001, 279-284.
Skoulidas et al. "Self-Diffusion and Transport Diffusion of Light Gases in Metal-Organic Framework Materials Assessed Using Molecular Dynamics Simulations." J. Phys. Chem., 2005, 15760-15768.
Smida et al. "Hydrothermal synthesis, thermal decomposition and optical properties of Fe2F5(H20)(Htaz)(taz)(Hdma)." Arabian Journal of Chemistry, Apr. 19, 2015, 6.
Subramanian et al. "Porous Solids by Design: [Zn(4,4'-bpy)2(SiF6)]n-xDMF, a Single Framework Octahedral Coordination Polymer with Large Square Channels." Angew. Chem. Int Ed. Engl., 1995, 2127-2129.
Uemura et al. "Syntheses, Crystal Structures and Adsorption Properties of Ultramicroporous Coordination Polymers Constructed from Hexafluorosilicate Ions and Pyrazine." Eur. J. Inorg. Chem., 2009, 2329-2337.
Vaidhyanathan et al. "Direct Observation and Quantification of CO2 Binding Within an Amine-Functionalized Nanoporous Solid." Science, vol. 330, Oct. 29, 2010, 650-653.
Veawab et al. "Corrosion Behavior of Carbon Steel in the CO2 Absorption Process Using Aqueous Amine Solutions." Ind. Eng. Chem. Res., 1999, 3917-3924.
Wang et al. "Colossal cages in zeolitic imidazolate frameworks as selective carbon dioxide reservoirs." Nature Publishing Group, 2008, 207-212.
Yang et al. "Computational Study of CO2 Storage in Metal-Organic Frameworks." American Chemical Society, 2008, 1562-1569.
Yang et al. "Hydrothermal synthesis and characterization of a series of luminescent Zn(ii) and Cd(ii) coordination polymers with the new versatile m ultidentate ligand 1,3-di(1,2,4-triazol-4-yl)benzene." Crystengcomm, VOi. 15, No. 40, Jan. 1, 2013, 8097.
Yang et al. "Molecular Simulation of Separation of CO2 from Flue Gases in Cu-BTC Metal-Organic Framework." AlChE Journal, Nov. 2007, 2832-2840.
Yazaydin et al. "Screening of metal-organic frameworks for carbon dioxide capture from flue gas using a combined experimental and modeling approach." J. Am. Chem. Soc. 131, 2009, 18198-18199.

* cited by examiner

METHODS FOR CAPTURING CO₂ FROM DILUTE CO2 STREAMS OF VARYING HUMIDITY, INCLUDING NATURAL GAS COMBINE CYCLE EXHAUST STREAMS AND AMBIENT AIR STREAMS USING KAUST-7 BASED PHYSISORBENTS

FIELD OF THE DISCLOSURE

The present disclosure relates to methods for capturing $CO_2$ from a gas stream, and in particular methods for capturing $CO_2$ from a gas stream containing low $CO_2$ concentration with varying humidity, such as a natural gas combine cycle exhaust stream and ambient air.

BACKGROUND OF THE DISCLOSURE

Reduction of carbon dioxide ($CO_2$) emissions into the atmosphere remains a top priority for combating global warming. $CO_2$ concentration in the atmosphere recently reached around 415 ppm and is increasing continuously at the rate of 2-3 ppm per year. These increases in atmospheric $CO_2$ concentration over the last century, mainly owing to industrial and vehicular $CO_2$ emissions, are directly related to global warming. If $CO_2$ emissions are not stopped or reduced drastically, the world will soon cross a tipping point of 450 ppm $CO_2$ concentration, which could lead to a series of environmental catastrophes.

Because the world likely will still be dependent on fossil fuels for the next few decades, $CO_2$ capture is an important technology for mitigating $CO_2$ emissions. Many efforts to develop material and technology to capture $CO_2$ from flue gas (industrial emission) as well as directly from air (direct air capture) have been undertaken in recent years. For instance, $CO_2$ capture from flue gas is currently done at 10-15% $CO_2$ concentration, and there are some emerging technologies for this purpose.

Direct air capture, however, is more complicated, as $CO_2$ needs to be captured from gas (air) having a $CO_2$ concentration of 400 ppm, more than 200 times lower than flue gas. The advantage of direct air capture is that capture can be carried out at any place in the world, and it can take care of emissions from diffuse sources like the transport sector. Among the investigated materials, liquid amines and other amine-based chemisorbents have shown promise for both of these applications. However, these chemisorbent materials require very high energy for regeneration (100-120 kj/mol), which would practically nullify the positive impact of $CO_2$ capture. Moreover, amine-based materials are prone to degradation and produce toxic decomposition products that can have a detrimental effect on the environment.

Another approach is to use physisorbent materials, where the driving force of $CO_2$ adsorption is nonbonding interaction between the physisorbent material and $CO_2$. Metal-organic framework (MOF) is a relatively new class of adsorbent that has received a lot of attention in recent times, mainly because of the crystalline and modular nature that can be used in a variety of applications ranging from separation, storage, catalysis, sensor, electrochemistry, etc. Over the years, many MOF materials have shown remarkable $CO_2$ capture properties.

$CO_2$ capture from Natural Gas Combined Cycle (NGCC) power plant is another challenging $CO_2$ capture application. NGCC is more efficient and environmentally friendly than traditional coal-based power stations, and thus most of the future fossil fuel-based power stations are expected to use natural gas. Consequently, there is a need for technology that can capture $CO_2$ from NGCC plants. However, currently there are no materials that can reliably and economically capture $CO_2$ from NGCC exhaust gas (e.g., 4% $CO_2$, 10-13% $O_2$). The main difficulties for NGCC $CO_2$ capture are low $CO_2$ concentration and high oxygen content of the exhaust gas stream. Most material does not fulfill the collective requirement of decent $CO_2$ capacity at 4% $CO_2$ concentration in the presence of moisture (humidity) and good oxygen stability at high temperatures.

In regard to the above background information, the present disclosure is directed to provide a technical solution for capturing $CO_2$.

SUMMARY OF THE DISCLOSURE

According to a first aspect, a method for capturing $CO_2$ from a humid natural gas combine cycle (NGCC) exhaust stream is provided. In the method, the humid NGCC exhaust stream is contacted with a metal organic framework (MOF) material KAUST-7. The humid NGCC exhaust stream comprises approximately 1 to 5% of $CO_2$ and approximately 10-13% of oxygen ($O_2$). The $CO_2$ from the humid NGCC exhaust stream is then captured with the MOF material KAUST-7 to generate a $CO_2$-concentrated gas stream comprising approximately 1-30% of $CO_2$, where the relative humidity of the humid NGCC exhaust stream is approximately 45-75% at 20-85° C. In another aspect, the relative humidity of the humid NGCC exhaust stream is approximately 50-70% at 20-85° C. In another aspect, the relative humidity of the humid NGCC exhaust stream is approximately 55-65% at 20-85° C. In another aspect, the balance of the humid NGCC exhaust stream is $N_2$. In another aspect, the $CO_2$ is captured with the MOF material KAUST-7 at a temperature in the range of approximately 20-85° C. and a pressure in the range of approximately 1-5 bar.

In a second aspect, a method for capturing $CO_2$ from a humid air stream is provided. In the method, the humid air stream is contacted with a metal organic framework (MOF) material KAUST-7. The humid air stream comprises approximately 400-1000 ppm of $CO_2$ and approximately 20-25% of $O_2$. The $CO_2$ from the humid air stream is then captured with the MOF material KAUST-7 to generate a $CO_2$-concentrated gas stream comprising approximately 1-30% of $CO_2$. The relative humidity of the humid air stream is approximately 5-75% at 0-55° C. In another aspect, the humid air stream comprises approximately 400-800 ppm of $CO_2$. In another aspect, the relative humidity of the humid air stream is approximately 50-70% at 0-55° C. In another aspect, the relative humidity of the humid air stream is approximately 55-65% at 0-55° C. In another aspect, the balance of the humid air stream is $N_2$ and $O_2$. In another aspect, the $CO_2$ is captured with the MOF material KAUST-7 at a temperature in the range of approximately 0-55° C. and a pressure in the range of approximately 1-5 bar.

In certain embodiments, the MOF material KAUST-7 is in the form of pellets, laminates, or other structured forms. In certain embodiments, the MOF material KAUST-7 is pretreated at a temperature in the range of approximately 60-150° C. under dynamic vacuum or dry inert gas to remove any previously adsorbed molecules. In certain embodiments, the MOF material KAUST-7 comprises an organic binder or an inorganic binder.

Any combinations of the various embodiments and implementations disclosed herein can be used. These and other aspects and features can be appreciated from the following description of certain embodiments and the accompanying drawings and claims.

BRIEF DESCRIPTION OF THE DRAWINGS

The processes of the present disclosure will be described in more detail below and with reference to the attached drawings.

DETAILED DESCRIPTION OF CERTAIN EMBODIMENTS OF THE DISCLOSURE

Disclosed herein are methods for capturing $CO_2$ from a gas stream containing low $CO_2$ concentration (400 ppm to 5% $CO_2$) with varying humidity. The $CO_2$ is captured from the humid gas stream using a metal organic framework (MOF) material, specifically a KAUST-7 (NbOFFIVE-1-Ni) physisorbent. In the method, the MOF KAUST-7 effectively captures $CO_2$ from gas streams with varying humidity, and the captured $CO_2$ can be thereby recovered in the form of a concentrated $CO_2$ stream (e.g., approximately 1-30% $CO_2$). In the methods, the gas stream can be a natural gas combine cycle (NGCC) exhaust stream or an ambient air stream with varying humidity, or a humid air stream, for example.

Direct air $CO_2$ capture and $CO_2$ capture from NGCC exhaust are considered very difficult compared to $CO_2$ capture from flue gas streams (10-15% $CO_2$). Moreover, $CO_2$ capture from humid gas streams has conventionally caused further difficulty, as moisture from $H_2O$ molecules typically interferes with the capture capacity of conventional capture methods and other physisorbents. For example, liquid or solid-supported amines have previously been used in $CO_2$ capture methods, but they are susceptible to degradation as the amount of oxygen increases, which can lead to corrosion. Likewise, zeolites and other physisorbents are used in some conventional $CO_2$ capture methods, but can be vulnerable to interference from water, which can affect their capture capabilities. However, the present methods, which utilizes a KAUST-7 physisorbent, results in surprisingly effective $CO_2$ capture from NGCC exhaust streams and air streams, even when said streams are humid gas streams. As such, the present methods can further expand the range of $CO_2$ capture technologies and accelerate efforts to mitigate increasing $CO_2$ concentration in the atmosphere and the accompanying global warming.

These and other aspects of the present systems and methods are described in further detail below. Further, as used in the present application, the term "approximately" when used in conjunction with a numerical value refers to any number within about 5, 3 or 1% of the referenced numerical value, including the referenced numerical value.

Figure 1:
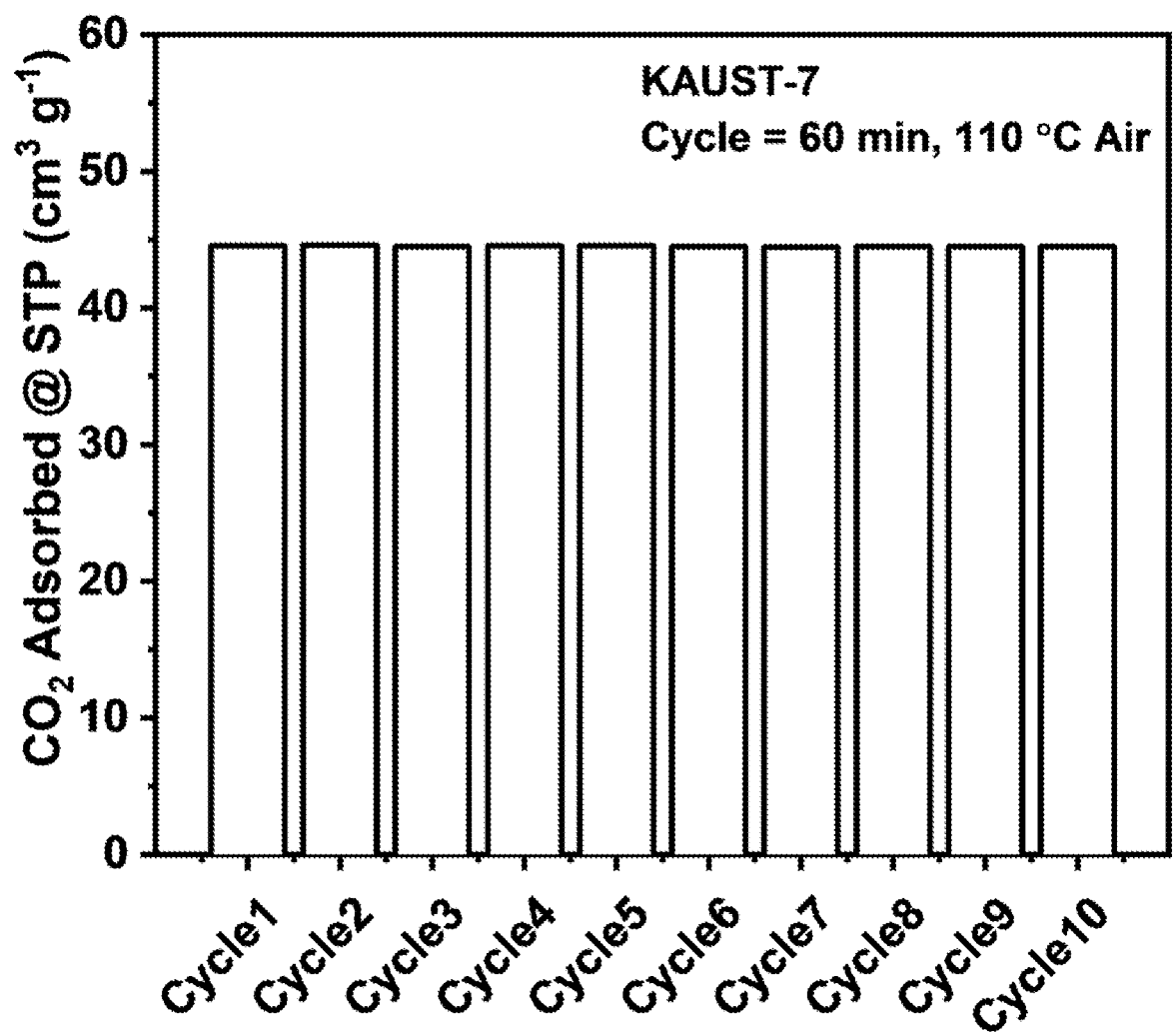
FIG. 1 displays a bar graph showing that $CO_2$ adsorption capacity of KAUST-7 MOF remains the same after 10 cycles of oxygen exposure at high temperatures suggesting high oxygen stability of the material in accordance with one or more embodiments. Each cycle includes exposure of the sample to hot air at 110° C. for 60 minutes.

As mentioned above, in accordance with one or more embodiments, the $CO_2$ capture portion of the methods of the present application are performed using the MOF material KAUST-7 (NbOFFIVE-1-Ni; CAS: 1973399-07-3). KAUST-7 exhibits excellent $O_2$ stability at high temperatures, as exhibit in the example of FIG. 1. FIG. 1 displays a bar graph showing the results of an experiment evaluating the $CO_2$ adsorption capacity of KAUST-7 MOF with repeated exposure to $O_2$ at high temperatures. In the experiment, KAUST-7 MOF undergoes 10 cycles of $O_2$ exposure at high temperatures, where each cycle includes exposure of the KAUST-7 MOF sample to hot air at 110° C. for 60 minutes. As shown in the bar graph of FIG. 1, KAUST-7 exhibits consistent $CO_2$ adsorption capacity after 10 cycles of oxygen exposure at high temperatures, suggesting high oxygen stability of the KAUST-7 MOF material.

Moreover, unlike many other physisorbents, moisture interference in $CO_2$ capture is negligible with KAUST-7 MOF, which allows KAUST-7 MOF to be particularly well-suited for $CO_2$ capture from humid NGCC exhaust streams and other humid gas streams.

In one or more embodiments, the KAUST-7 MOF material is in the form of pellets, laminates, or other structured forms of the MOF such as a monolith or any other structured form to hold MOF particles in a particular shape. The KAUST-7 MOF material can also comprise one or more appropriate binders (e.g., organic or inorganic binders). In at least embodiment, the one or more binders can include but are not limited to one or more of the following: organic polymers (e.g., polyethylene, polystyrene, polyethylene glycol, polyvinyl alcohol, polysulfone, polymethylmethacrylate) and inorganic binders (e.g., kaolinite, gypsum). The KAUST-7 and binder composition can be in the range of 95:5 to 70:30. In at least one embodiment, cylindrical shaped pallets can be prepared with a composition that has 90% KAUST-7, and 10% of a polymethylmethacrylate type binder.

In one or more embodiments, the KAUST-7 MOF material of the present methods can be in a closed module that comprises the KAUST-7 MOF material and a binder. In at least one embodiment, the closed module can include one or more gas valves configured to manipulate the flow of the gas stream inside the module.

Figure 2:
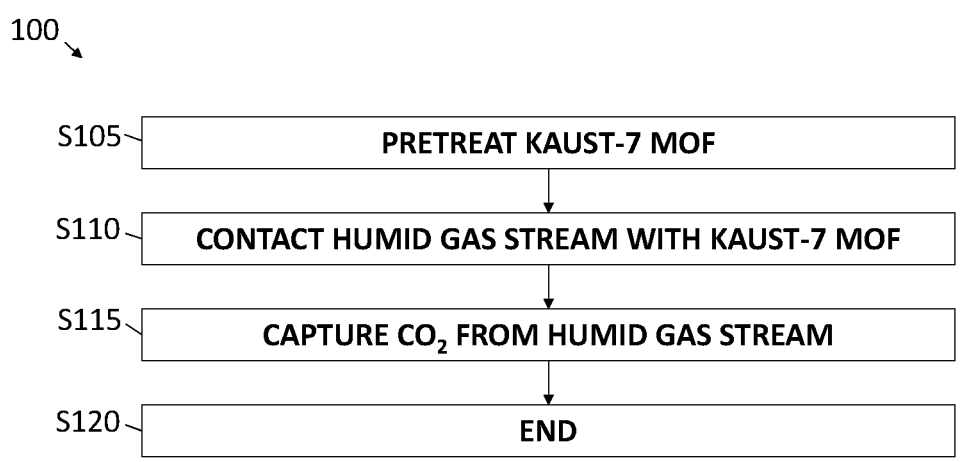
FIG. 2 displays a flow diagram showing steps of a method for capturing $CO_2$ from a humid gas stream using a KAUST-7 MOF physisorbent in accordance with one or more embodiments.

A flow diagram showing steps of the method for capturing $CO_2$ from a humid gas stream using the present KAUST-7 MOF physisorbent is provided in FIG. 2 in accordance with one or more embodiments. With reference now to the flow diagram of FIG. 2, the method 100 begins at a step S105 where the KAUST-7 MOF material is pretreated at a suitable temperature under airflow, vacuum, or other methods. In one or more embodiments, pretreatment of the KAUST-7 MOF material removes any previously adsorbed molecules such as $H_2O$ and other guest molecules before the gas stream is introduced into the KAUST-7 MOF material. Pretreatment of the KAUST-7 MOF material can improves its ability to adsorb target molecules (e.g. $CO_2$) in the pores. In one or more embodiments, during pretreatment, the KAUST-7 MOF material is subjected to a temperature in the range of approximately 60-150° C. under dynamic vacuum or dry inert gas (e.g., $N_2$, $O_2$, Ar, He or air) flow. In an embodiment in which the KAUST-7 MOF material used is in a closed module in the present method, the pretreated KAUST-7 MOF material is incorporated into the closed module, along with a binder for example. In one or more embodiments, pretreatment of the KAUST-7 MOF material is performed after the KAUST-7 MOF material has been incorporated in the closed module.

In one or more embodiments, pretreatment of the KAUST-7 MOF material is optional, and as-made KAUST-7 MOF material can be loaded in a closed module.

With continued reference to FIG. 2, at step S110, a humid gas stream is introduced into the KAUST-7 MOF material. In one or more embodiments, the humid gas stream is a humid NGCC exhaust stream comprising approximately 1% to 5% of $CO_2$ and approximately 10-13% of $O_2$. In at least one embodiment, the humid NGCC exhaust stream comprises approximately 1-10% of $CO_2$ and approximately 10-13% of $O_2$. In one or more embodiments, the remainder or balance of the humid NGCC exhaust stream is $N_2$ (e.g., approximately 77% to approximately 89% of the NGCC exhaust stream). In one or more embodiments, the humid NGCC exhaust stream comprises approximately 400 ppm to 4%, 400 ppm to 3%, 400 ppm to 2%, 400 ppm to 1%, 1-5%, or 4% $CO_2$. In one or more embodiments, the relative humidity (RH) of the humid NGCC exhaust stream is approximately 45-75%, 45-70%, 50-70%, 50-65%, 50-60%, or 55-65% at 20-85° C. In at least one embodiment, the relative humidity of the humid NGCC exhaust stream is approximately 50% at 20-85° C. In at least one embodiment, the relative humidity of the humid NGCC exhaust stream is approximately 65% at 20-85° C. In one or more embodiments, the NGCC exhaust gas stream further comprises 2-10% $H_2O$ vapor. In one or more embodiments, the NGCC exhaust gas can include other components such as small proportions of $SO_2$ and $NO_x$.

In one or more embodiments, the humid gas stream can be first cooled to a suitable temperature (approximately 0-55° C.) before being contacted with the KAUST-7 MOF material. In at least one embodiment, the temperature during adsorption (capture) by the KAUST-7 MOF material is also in the same temperature range (e.g., approximately 0-55° C.) and the temperature of the incoming gas stream helps it to maintain the similar temperature.

In one or more embodiments, the humid gas stream is a humid air stream comprises approximately 400-1000 ppm, 400-900 ppm, 400-800 ppm, 400-700 ppm, 400-600 ppm, or 400-500 ppm of $CO_2$ and approximately 20-25% of $O_2$. In one or more embodiments, the balance of the humid air stream is $N_2$ and $O_2$. In one or more embodiments, the humid air stream comprises approximately 400 ppm of $CO_2$. In one or more embodiments, the relative humidity of the humid air stream is approximately 5-75%, 10-75%, 15-75%, 20-75%, 25-75%, 30-75%, 35-75%, 40-75%, 45-75%, 50-70%, 50-60%, or 55-65% at 0-55° C. In at least one embodiment, the relative humidity of the humid air stream is approximately 50% at 0-55° C. In at least one embodiment, the relative humidity of the humid air stream is approximately 65% at 0-55° C. In one or more embodiments, the humid air stream can be breathable air (e.g., atmospheric air), which can include one or more of nitrogen ($N_2$), oxygen ($O_2$), and argon (Ar) in addition to $CO_2$.

In one or more embodiments, the flow rate of the humid gas stream (e.g., humid air steam, humid NGCC exhaust stream) depends on the capacity of the plant (e.g., NGCC plant), and thus can be any flow rate of NGCC exhaust, for example.

Once the humid gas stream is contacted with the KAUST-7 MOF material, at step S115 the $CO_2$ in the humid gas stream is captured by the KAUST-7 MOF material. In one or more embodiments, the capturing of the $CO_2$ comprises physical adsorption of the $CO_2$ by the KAUST-7 MOF material. In one or more embodiments, the KAUST-7 MOF material has a $CO_2$ adsorption capacity in the range of approximately 0.5 wt %-10 wt %. In one or more embodiments, the KAUST-7 MOF material also becomes saturated with water under the humid conditions of the humid gas stream (humid NGCC exhaust stream, humid air stream).

In one or more embodiments, the $CO_2$ is captured by the KAUST-7 MOF material at a temperature in the range of approximately 20-85° C. from the humid NGCC exhaust stream. In one or more embodiments, the $CO_2$ is captured by the KAUST-7 MOF material at a temperature in the range of approximately 0-55° C. from the humid air stream.

In one or more embodiments, the $CO_2$ is captured from the humid gas stream by the KAUST-7 MOF material at a pressure in the range of approximately 1-5 bar.

In one or more embodiments, capturing the $CO_2$ can comprise wholly or partially containing the $CO_2$ within pores of the KAUST-7 MOF material.

In one or more embodiments, such as embodiments in which the KAUST-7 MOF is in a closed module, the capturing of the $CO_2$ results in the generation of a $CO_2$-free (or substantially $CO_2$-free) stream (i.e., the remainder of the gas stream from which the $CO_2$ was captured) in the KAUST-7-based closed module, and once the KAUST-7 MOF material is saturated with $CO_2$, the $CO_2$-free gas stream can be discharged from the closed module into the atmosphere, or optionally subjected to additional treatment, for example, to remove other components such as $SO_2$ and $NO_x$.

In one or more embodiments, the captured $CO_2$ in the KAUST-7 MOF material can be later provided as a $CO_2$-rich stream ($CO_2$-concentrated gas stream). In one or more embodiments, hot air, hot nitrogen, vacuum, or other suitable methods, or a combination thereof can be used to recover the adsorbed $CO_2$ from the KAUST-7 MOF material to produce the $CO_2$-rich gas stream. In one or more embodiments, the generated $CO_2$-rich stream comprises approximately 1-30% of $CO_2$. In one or more embodiments, the generated $CO_2$-rich stream comprises approximately 5-30% of $CO_2$, 10-30% of $CO_2$, 15-30% $CO_2$, 20-30% $CO_2$, 1-20% of $CO_2$, 5-20% of $CO_2$, or 10-20% of $CO_2$. In at least one embodiment, the generated $CO_2$-rich stream can be later purified directly ($CO_2$ purification) or can be mixed with another stream of industrial exhaust with similar $CO_2$ concentrations before purification. In one or more embodiments the generated $CO_2$-rich stream is subsequently purified to result in a pure or substantial pure (at least 90%) $CO_2$ stream. Purification of the $CO_2$-rich stream can be done via a $CO_2$ purification unit or via other technologies as known in the art.

In at least one embodiment, the generated CO2-rich stream is not subsequently purified, and can be used as is for future applications, such as in the greenhouse for better yield of agricultural product.

By capturing the $CO_2$ via adsorption, the KAUST-7 MOF material becomes saturated. In at least one embodiment, once the MOF material is saturated with $CO_2$, the humid gas stream is stopped from contacting the KAUST-7 MOF material. In at least one embodiment, such as when the KAUST-7 MOF material is part of a closed module, the closed module can include one or more gas valves for receiving and dispersing of gas streams. The gas valves are configured to manipulate the flow of the gas stream inside the closed module. For example, in one or more embodiments, the gas stream is stopped from entering the closed module upon saturation of the KAUST-7 MOF material by closing one or more valves of the closed module. In at least one embodiment, the gas stream is stopped from entering the closed module by closing one or more valves of the NGCC exhaust unit.

Finally, at step S120, the method ends. In one or more embodiments, the length of time of a cycle of the $CO_2$ capture method of the present application can vary from approximately 1 minutes to approximately 30 minutes. However, it should be understood that in at least one embodiment, the length of time can vary even more that the above range based upon many factors, such as the amount of KAUST-7 material used, flow rate, etc.

The aforementioned features and aspects of the present system and methods are further described in the following examples with reference to FIGS. 3-7. These examples utilize the exemplary MOF material of the present system and method, KAUST-7. As exemplified in FIGS. 3-7, KAUST-7 provides excellent $CO_2$ capture properties from humid streams and excellent oxygen stability.

EXAMPLES

To understand $H_2O/CO_2$ co-adsorption with KAUST-7, humid $CO_2$ breakthrough experiments were performed, followed by adsorbed phase analysis using temperature-programmed desorption (TPD) experiments. Humid streams containing 10% and 1% $CO_2$ concentration were used for the experiments. The results indicate that humidity has a minimal impact on $CO_2$ capture capacity of the KAUST-7 MOF material even after water breakthrough (saturation of column with water vapor) for gas streams having between 1-10% $CO_2$ concentrations. Hence, it can be concluded that humidity has a minimal impact on $CO_2$ capture performance of KAUST-7 and KAUST-7 maintains good $CO_2$ capture performance under NGCC exhaust conditions (e.g., humid gas comprising approximately 4% $CO_2$).

Experiments with 10% $CO_2$ (Balance $N_2$) at 65% RH (FIGS. 3-5)

Breakthrough experiments were performed for KAUST-7 with a gas composition of 10% $CO_2$ (balance $N_2$) and humidity (65% RH) with a flow rate of 5 cc/min at 298 K. The breakthrough curve shows that $CO_2$ breaks at 94 min/g, equivalent to 2.0 mmol/g and water breaks at 526 min/g equivalent to 2.5 mmol/g. To gain more insights on the adsorbed phase compositions and if the $CO_2$ remains adsorbed after the water breakthrough, temperature-programmed desorption (TPD) was performed at different stages of the breakthrough experiment: 1) after $CO_2$ breakthrough, 2) in between $CO_2$ and $H_2O$ breakthrough, and 3) after $H_2O$ breakthrough.

Figure 3A:
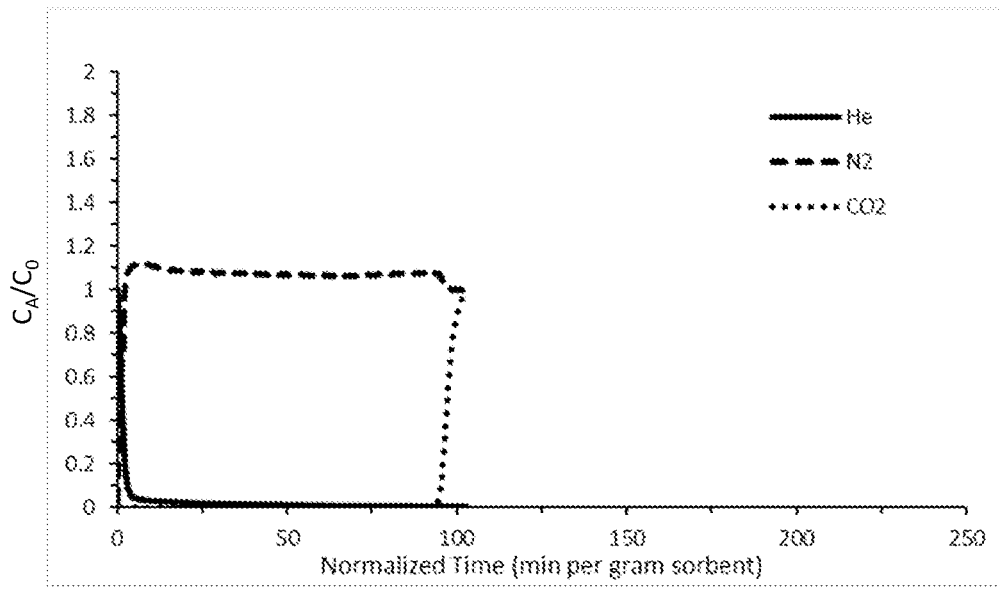
FIGS. 3A-3B display the results of (3A) a breakthrough experiment of KAUST-7 with 10% $CO_2$ (Balance $N_2$) and humidity (65% RH) with a flow rate of 5 cc/min and (3B) the corresponding TPD after $CO_2$ breakthrough in accordance with one or more embodiments.
Figure 3B:
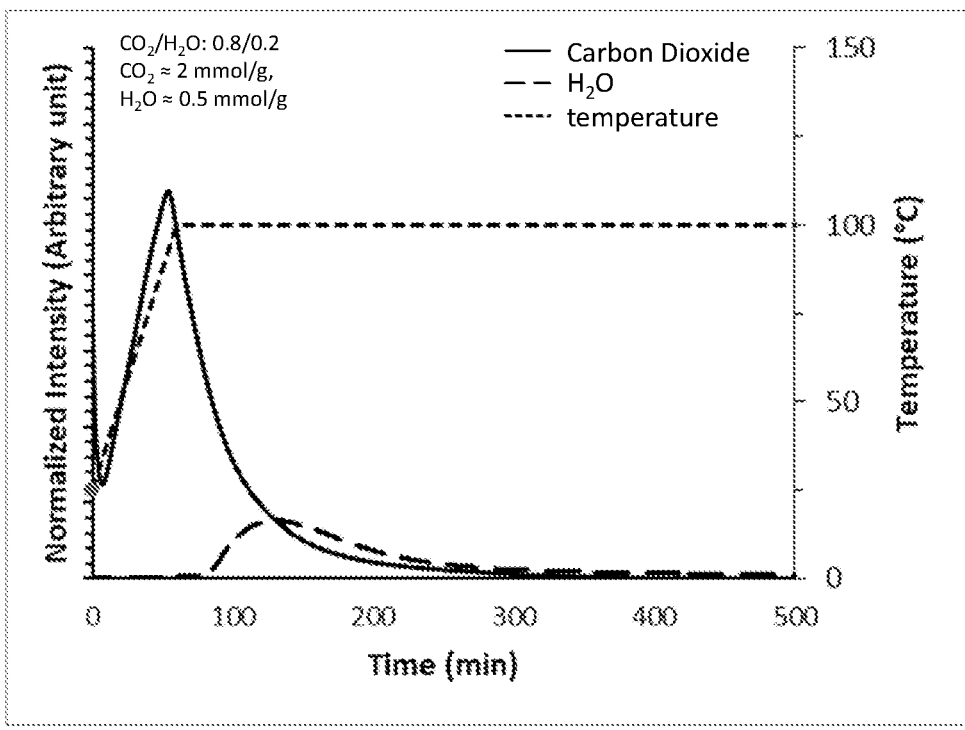

1) After $CO_2$ Breakthrough (FIGS. 3A-3B)

FIGS. 3A-3B display the results of (FIG. 3A) the breakthrough experiment of KAUST-7 with 10% $CO_2$ (Balance $N_2$) and humidity (65% RH) with a flow rate of 5 cc/min and (FIG. 3B) the corresponding TPD after $CO_2$ breakthrough. The breakthrough experiment was stopped just after $CO_2$ breakthrough ($\approx$94 min/g, $\approx$2.0 mmol/g). The TPD experiment was carried out immediately after and the adsorbed phase contains $\approx$2.0 mmol/g $CO_2$ and $\approx$0.5 mmol/g of $H_2O$.

Figure 4A:
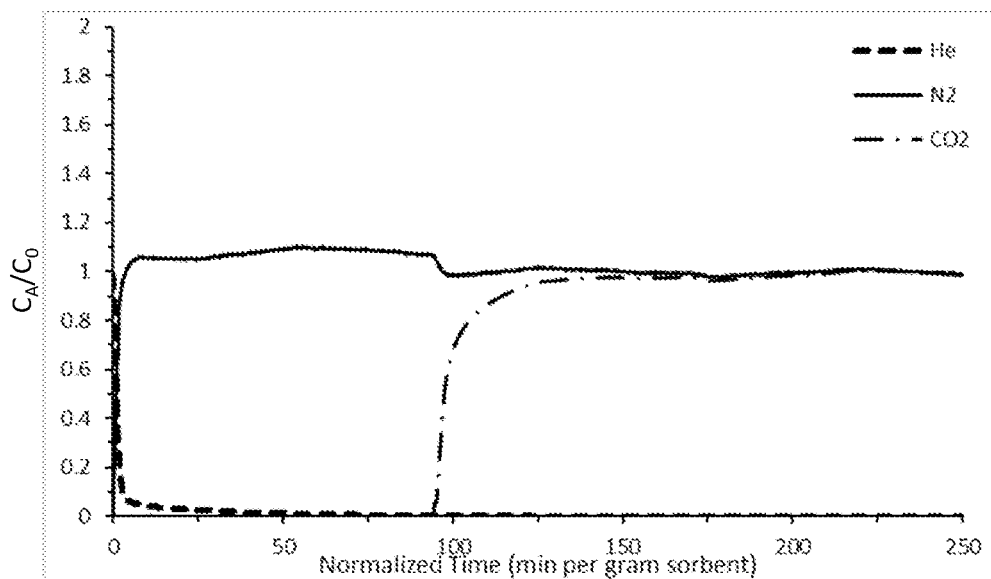
FIGS. 4A-4B display the results of (4A) a breakthrough experiment of KAUST-7 with 10% $CO_2$ (Balance $N_2$) and humidity (65% RH) with a flow rate of 5 cc/min, stopped in between $CO_2$ and $H_2O$ breakthrough, and (4B) the corresponding TPD in between $CO_2$ and $H_2O$ breakthrough in accordance with one or more embodiments.
Figure 4B:
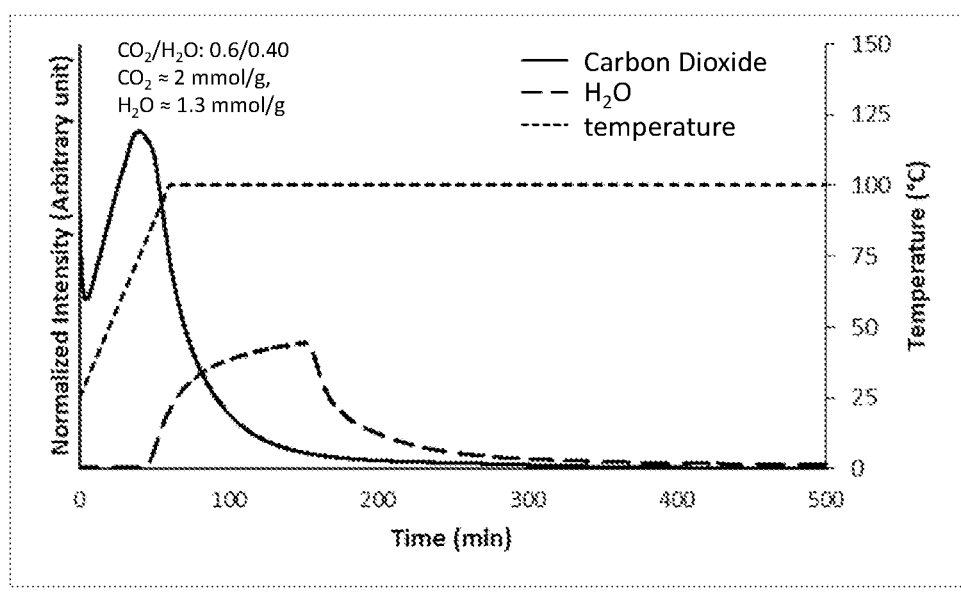

2) In Between $CO_2$ and $H_2O$ Breakthrough (FIGS. 4A-4B)

FIGS. 4A-4B display the results of (FIG. 4A) the breakthrough experiment of KAUST-7 with 10% $CO_2$ (Balance $N_2$) and humidity (65% RH) with a flow rate of 5 cc/min, stopped in between $CO_2$ and $H_2O$ breakthrough, and (FIG. 4B) the corresponding TPD in between $CO_2$ and $H_2O$ breakthrough. The breakthrough experiment was stopped in between $CO_2$ and $H_2O$ breakthrough after the normalized time of 250 min/g. The TPD experiment was carried out immediately after and the adsorbed phase contains $\approx$2.0 mmol/g $CO_2$ and $\approx$1.3 mmol/g of $H_2O$.

Figure 5A:
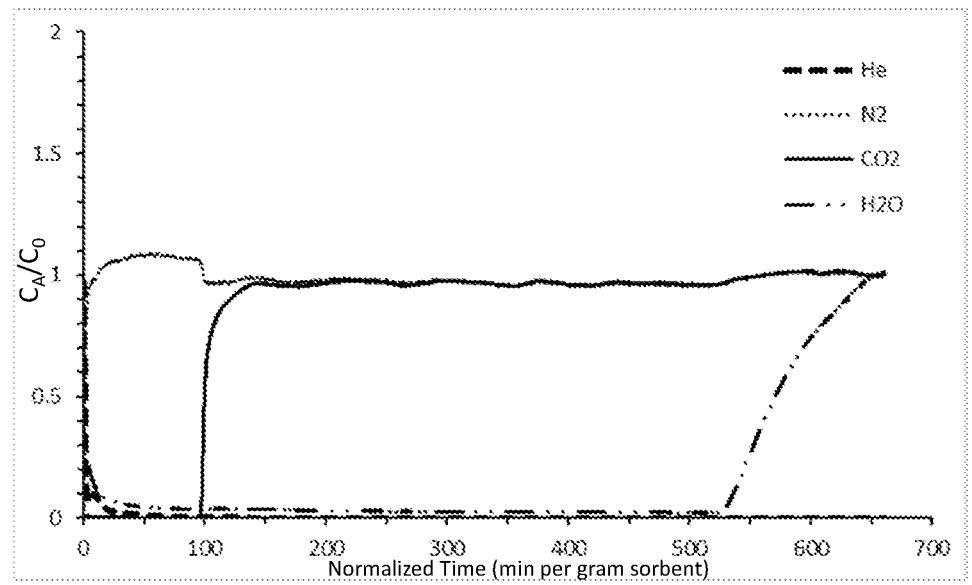
FIGS. 5A-5B display the results of (5A) a breakthrough experiment of KAUST-7 with 10% $CO_2$ (balance $N_2$) and humidity (65% RH) with a flow rate of 5 cc/min, stopped after $H_2O$ breakthrough, and (5B) the corresponding TPD after $H_2O$ breakthrough in accordance with one or more embodiments.
Figure 5B:
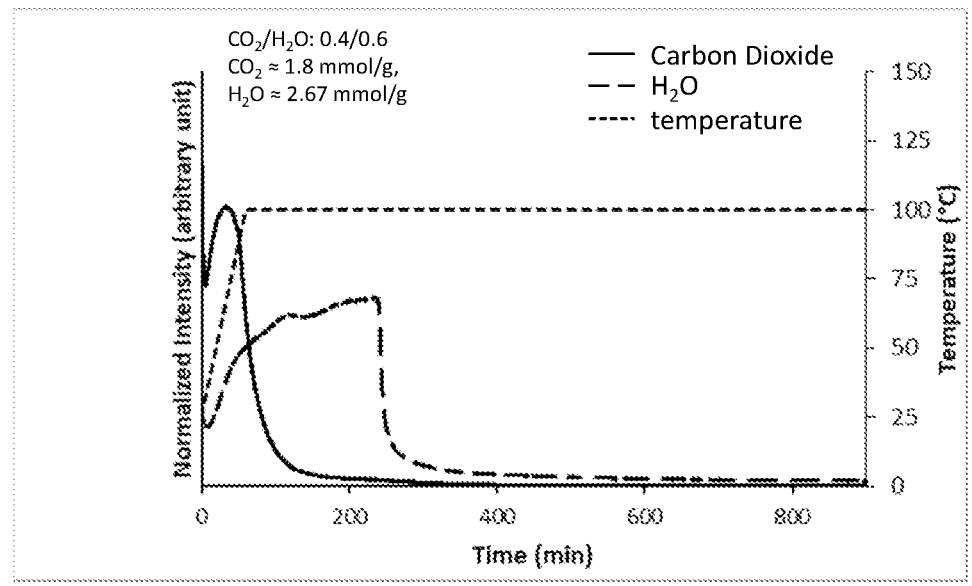

3) After $H_2O$ Breakthrough (FIGS. 5A-5B).

FIGS. 5A-5B display the results of (FIG. 5A) the breakthrough experiment of KAUST-7 with 10% $CO_2$ (balance $N_2$) and humidity (65% RH) with a flow rate of 5 cc/min, stopped after $H_2O$ breakthrough, and (FIG. 5B) the corresponding TPD after $H_2O$ breakthrough. The breakthrough experiment was stopped after $H_2O$ breakthrough (526 min/g, $\approx$2.5 mmol/g) at normalized time 660 min/g. The TPD experiment was carried out immediately after and the adsorbed phase contains $\approx$1.8 mmol/g $CO_2$ and $\approx$2.67 mmol/g of $H_2O$ (FIG. 4).

It is evident from these experiments that under the above conditions (10% $CO_2$ in the presence of 65% RH humidity), $CO_2$ concentration in the adsorbed phase is minimally affected by water even after water breakthrough.

Experiments with 1% $CO_2$ (Balance $N_2$) Under Dry and Humid Conditions (50% RH)

Similar experiments were also performed with a gas comprising 1% $CO_2$ (balance $N_2$) under dry and humid conditions (50% RH).

1) 1% $CO_2$ Breakthrough Under Dry Conditions and Corresponding TPD

Figure 6A:
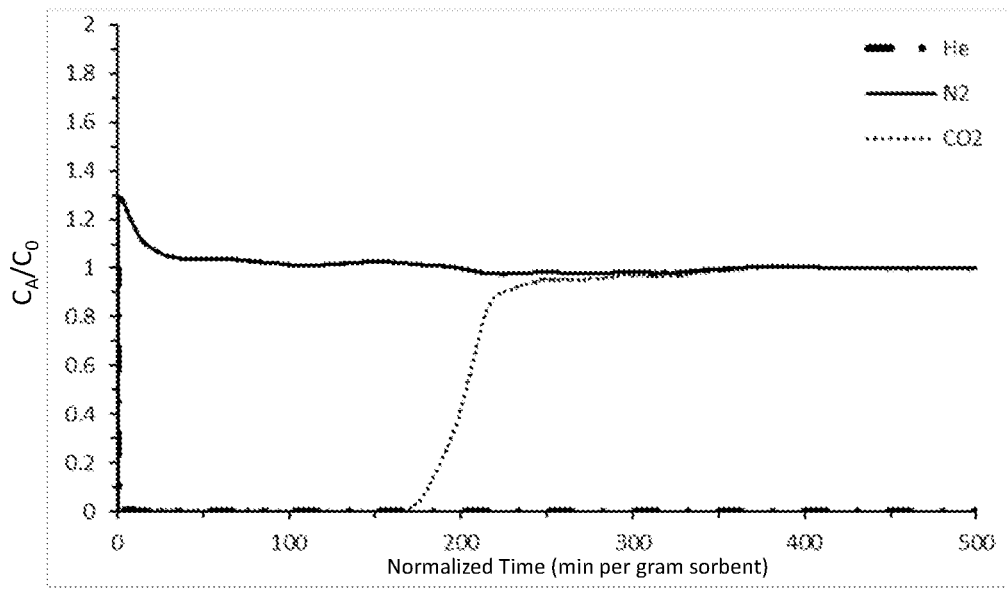
FIGS. 6A-6B display the results of (6A) a breakthrough experiment of KAUST-7 with 1% $CO_2$ (balance $N_2$) under dry conditions with a flow rate of 25 cc/min at 298 K, and (6B) the corresponding TPD after $CO_2$ breakthrough experiment in dry conditions in accordance with one or more embodiments.
Figure 6B:
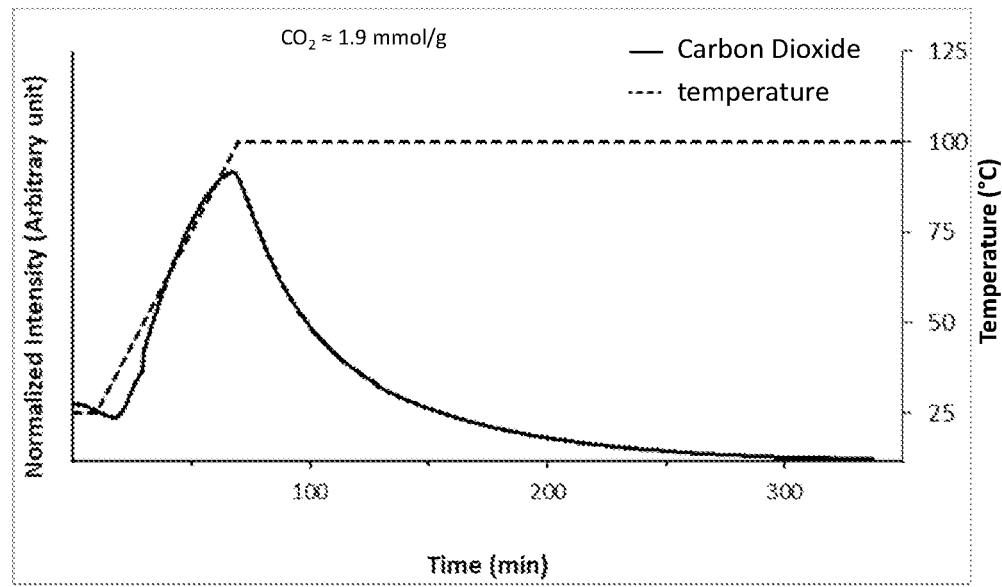

FIGS. 6A-6B display the results of (FIG. 6A) the breakthrough experiment of KAUST-7 with 1% $CO_2$ (balance $N_2$) under dry conditions with a flow rate of 25 cc/min at 298 K, and (FIG. 6B) the corresponding TPD after $CO_2$ breakthrough experiment in dry conditions, where the $CO_2$ breakthrough occurred at normalized time 170 g/min, which corresponds to 1.9 mmol/g $CO_2$ uptake. The TPD experiment was carried out after the breakthrough experiment.

Figure 7A:
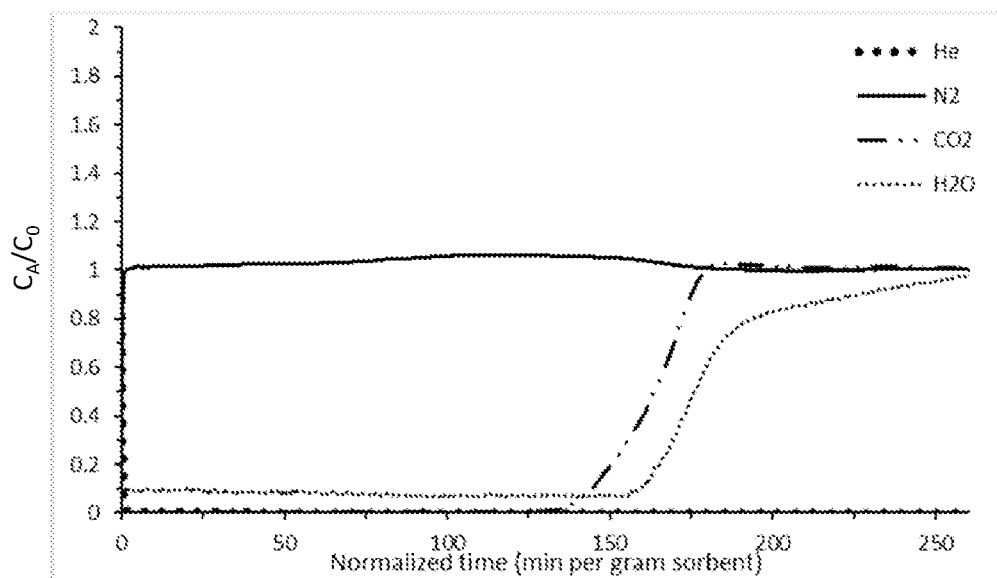
FIGS. 7A-7B display (7A) a breakthrough experiment of KAUST-7 with 1% $CO_2$ (balance $N_2$) in the presence of humidity (50% RH) with a flow rate of 25 cc/min at 298 K, and (7B) the corresponding TPD after water breakthrough in accordance with one or more embodiments.
Figure 7B:
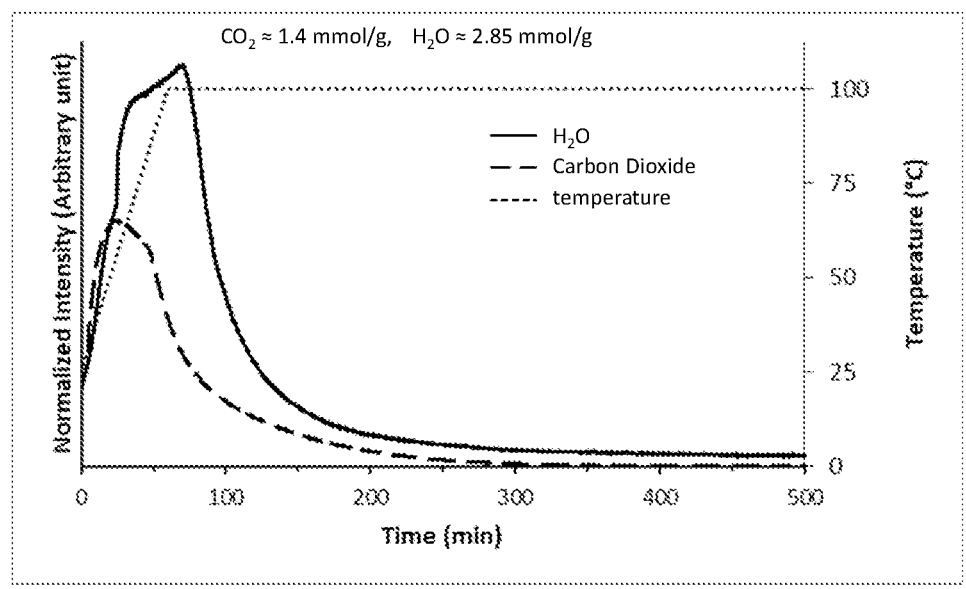

2) 1% $CO_2$ Breakthrough Experiment in the Presence of Humidity (50% RH) and Corresponding TPD FIGS. 7A-7B displays (FIG. 7A) the breakthrough experiment of KAUST-7 with 1% $CO_2$ (balance $N_2$) in the presence of humidity (50% RH) with a flow rate of 25 cc/min at 298 K, and (FIG. 7B) the corresponding TPD after water breakthrough, where the $CO_2$ breakthrough occurred at normalized time 135 min/g ($\approx$1.5 mmol/g $CO_2$), while $H_2O$ breakthrough occurred at normalized time 155 min/g ($\approx$2.6 mmol/g $H_2O$). The breakthrough experiment was stopped well after the $H_2O$ breakthrough (normalized time 260 min/g) and TPD was carried out. The TPD experiment indicates that the adsorbed phase contains $\approx$1.4 mmol/g $CO_2$ and $\approx$2.85 mmol/g $H_2O$.

It is evident from the above experiments, in which the $CO_2$ concentration in the gas ranged from 10% to 1% in the presence of humidity, that $CO_2$ uptake at saturation (after water breakthrough) decreases as $CO_2$ concentration decreases. However, even for 1% $CO_2$ (50% RH) adsorbed phase contains 1.4 mmol/g of $CO_2$ after water breakthrough, which is surprising because, in most of the physisorbents, water replaces most of $CO_2$ at this concentration. These experiments indicate that KAUST-7 MOF exhibits good $CO_2$ uptake in the presence of humidity for gases having a low $CO_2$ concentration of 1%.

The results of the experiments also indicate that humidity has a minimal impact on the $CO_2$ capture capacity of KAUST-7 MOF even after water breakthrough (saturation of column with water vapor) between 1-10% $CO_2$ concentrations, which demonstrates that $CO_2$ capture performance of KAUST-7 is maintained under NGCC exhaust conditions (e.g., 4% $CO_2$ humid gas).

As exemplified by the above experiments, the present methods provide remarkable $CO_2$ capture capabilities for humid gas streams. As such, the present methods are effective for $CO_2$ capture from NGCC exhaust streams, which results in positive environmental impacts. Specifically, NGCC is more efficient and environmental friendly than traditional coal-based power stations and will likely replace many coal-based power stations in the immediate future. As such, there is a need for technology that can capture $CO_2$ from NGCC plants. Before the present methods, conventional methods and materials have been unable to reliably and economically capture $CO_2$ from NGCC exhaust gas. However, as shown in the present application, the present methods utilizing KAUST-7 MOF exhibit excellent $CO_2$ capture properties for NGCC conditions and oxygen stability even at high temperatures.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for capturing $CO_2$ from a humid natural gas combine cycle (NGCC) exhaust stream, comprising:
   contacting the humid NGCC exhaust stream with a metal organic framework (MOF) material KAUST-7, wherein the humid NGCC exhaust stream comprises approximately 1 to 5% of $CO_2$ and approximately 10-13% of $O_2$; and
   capturing, with the MOF material KAUST-7, $CO_2$ from the humid NGCC exhaust stream to generate a $CO_2$-concentrated gas stream comprising approximately 10-30% of $CO_2$,
   wherein the relative humidity of the humid NGCC exhaust stream is approximately 45-75% at 20-85° C.

2. The method of claim 1, wherein the relative humidity of the humid NGCC exhaust stream is approximately 50-70% at 20-85° C.

3. The method of claim 1, wherein the relative humidity of the humid NGCC exhaust stream is approximately 55-65% at 20-85° C.

4. The method of claim 1, wherein the balance of the humid NGCC exhaust stream is $N_2$.

5. The method of claim 1, wherein the $CO_2$ is captured with the MOF material KAUST-7 at a temperature in the range of approximately 20-85° C. and a pressure in the range of approximately 1-5 bar.

6. The method of claim 1, wherein the MOF material KAUST-7 is in the form of pellets, laminates, or other structured forms.

7. The method of claim 1, wherein the MOF material KAUST-7 is pretreated at a temperature in the range of approximately 60-150° C. under dynamic vacuum or dry inert gas to remove any previously adsorbed molecules.

8. The method of claim 1, wherein the MOF material KAUST-7 comprises an organic binder or an inorganic binder.

* * * * *